US012786367B2

(12) United States Patent
Suyama et al.

(10) Patent No.: US 12,786,367 B2
(45) Date of Patent: Nov. 3, 2026

(54) OPTICAL MEMBER, OPTICAL SYSTEM, AND SPECTROSCOPIC DEVICE

(71) Applicant: CANON KABUSHIKI KAISHA, Tokyo (JP)

(72) Inventors: Yukimasa Suyama, Tokyo (JP); Masatsugu Koyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/218,938

(22) Filed: May 27, 2025

(65) Prior Publication Data

US 2025/0373774 A1 Dec. 4, 2025

(30) Foreign Application Priority Data

Jun. 3, 2024 (JP) ................................ 2024-090047

(51) Int. Cl.
*H04N 13/214* (2018.01)

(52) U.S. Cl.
CPC ................................ *H04N 13/214* (2018.05)

(58) Field of Classification Search
CPC ................................................... H04N 13/214
See application file for complete search history.

(56) References Cited

U.S. PATENT DOCUMENTS

| | | | |
|---|---|---|---|
| 9,541,757 B2 * | 1/2017 | Yokoyama | G02B 27/4277 |
| 10,641,656 B1 * | 5/2020 | Kobayashi | G01J 3/0229 |
| 11,624,862 B2 | 4/2023 | Enokida et al. | |
| 11,880,025 B2 | 1/2024 | Sukegawa | |
| 2002/0101574 A1 | 8/2002 | Tsuji | |
| 2011/0255086 A1 | 10/2011 | Zhou | |
| 2015/0109676 A1 | 4/2015 | Kobayashi | |
| 2015/0369977 A1 | 12/2015 | Enokida et al. | |
| 2019/0041557 A1 | 2/2019 | Enokida et al. | |
| 2022/0196997 A1 | 6/2022 | Sukegawa | |
| 2023/0305279 A1 | 9/2023 | Koyama | |

FOREIGN PATENT DOCUMENTS

| | | |
|---|---|---|
| JP | H11-218677 A | 8/1999 |
| JP | 2000-284105 A | 10/2000 |
| JP | 2008-185525 A | 8/2008 |

(Continued)

OTHER PUBLICATIONS

Oct. 28, 2025 United Kingdom Official Action in United Kingdom Patent Appln. No. GB2508711.5.

*Primary Examiner* — Girumsew Wendmagegn
(74) *Attorney, Agent, or Firm* — Venable LLP

(57) ABSTRACT

An optical member includes a through hole penetrating from a first opening to a second opening. A light flux of observation light incident through the first opening can exit through the second opening. The through hole includes an inclined wall surface inclined with respect to an optical axis of the light flux such that a portion having an inner diameter smaller than an inner diameter of the first opening is disposed between the first opening and the second opening. The light flux of the observation light incident through the first opening is condensable in the through hole. The inclined wall surface is configured to reflect stray light incident on the first opening from a direction different from the optical axis of the light flux of the observation light toward the second opening at least once.

20 Claims, 13 Drawing Sheets

(56) References Cited

FOREIGN PATENT DOCUMENTS

| | | | |
|---|---|---|---|
| JP | 2015-049276 | A | 3/2015 |
| JP | 2016-021057 | A | 2/2016 |
| JP | 2017-067933 | A | 4/2017 |
| JP | 2022-096461 | A | 6/2022 |
| JP | 2023-062612 | A | 5/2023 |
| WO | 2020/203976 | A1 | 10/2020 |

* cited by examiner

OPTICAL MEMBER, OPTICAL SYSTEM, AND SPECTROSCOPIC DEVICE

BACKGROUND

Field of the Technology

The present disclosure relates to an optical member that allows a light flux traveling on a predetermined optical path to pass and suppresses so-called stray light deviating from the predetermined optical path from passing, and the like.

Description of the Related Art

Hitherto, in various fields such as astronomical observation and material analysis, a spectroscopic device that disperses light for each wavelength, receives the light by a detector, and measures an intensity of the light has been used.

JP 2016-21057 A proposes an optical element for a spectroscopic device used in the field of astronomical observation and the like. There has been proposed an optical element useful for configuring a plane division optical system when spectrum observation is simultaneously performed on two-dimensional spatial information acquired by one-time exposure.

JP 2022-96461 A proposes a plane spectroscopic device including a reflection unit that splits a light flux incident from an object surface side into a plurality of light fluxes and reflects the light fluxes at different positions, an imaging mirror, a spectroscopic element such as a diffraction grating, and a detection unit.

JP 2008-185525 A describes that a detachable light trapping member is provided in a spectrometer in which an F value of an exiting light flux is variable. The light trapping member includes a plurality of protruding pieces protruding toward an optical axis, and has a structure that guides and traps stray light that has entered a recessed space between the plurality of protruding pieces and does not allow the stray light to escape. A length of a protruding piece protruding toward the optical axis on an exit side is larger than a length of a protruding piece on a light entrance side. In addition, the length of the protruding piece is different for each light trapping member, and an appropriate light trapping member is selected according to an F value to be set and mounted on the spectrometer.

In a spectrometer including a plane division optical system, a large number of optical elements (for example, a reflective element, a refractive element, and a diffractive element) are disposed in order to split observation light incident from an object surface side into a plurality of light fluxes and guide the light fluxes to a detector. In a process of splitting the light flux and guiding the light fluxes to the detector, for example, some of the light fluxes are scattered at an edge portion of a mirror and propagate in an unintended direction, as a result of which so-called stray light may occur. When the stray light reaches the detector and is detected, the stray light becomes noise, which causes a decrease in spectral accuracy of the spectroscopic device.

In the light trapping member described in JP 2008-185525 A, a structure of the recessed portion that traps the stray light is complicated, and thus, the light trapping member has a large size in a direction orthogonal to the optical axis. Therefore, in a plane division optical system that handles a large number of light fluxes, it is difficult to apply the light trapping member to an optical path of each light flux.

In this regard, there has been a demand for an optical member for a spectroscopic device, which allows a light flux traveling on a predetermined optical path to pass, can suppress so-called stray light deviating from the predetermined optical path from passing, and has a simple structure. In addition, there has been a demand for a spectroscopic device that includes a plane division optical system, suppresses noise caused by stray light, and has high spectral accuracy.

SUMMARY

According to a first aspect of the present disclosure, an optical member includes a through hole penetrating from a first opening to a second opening. A light flux of observation light incident through the first opening can exit through the second opening. The through hole includes an inclined wall surface inclined with respect to an optical axis of the light flux such that a portion having an inner diameter smaller than an inner diameter of the first opening is disposed between the first opening and the second opening. The light flux of the observation light incident through the first opening is condensable in the through hole. The inclined wall surface is configured to reflect stray light incident on the first opening from a direction different from the optical axis of the light flux of the observation light toward the second opening at least once.

Features of the present disclosure will become apparent from the following description of embodiments with reference to the attached drawings. The following description of embodiments are described by way of example.

DESCRIPTION OF THE EMBODIMENTS

Figure 1:
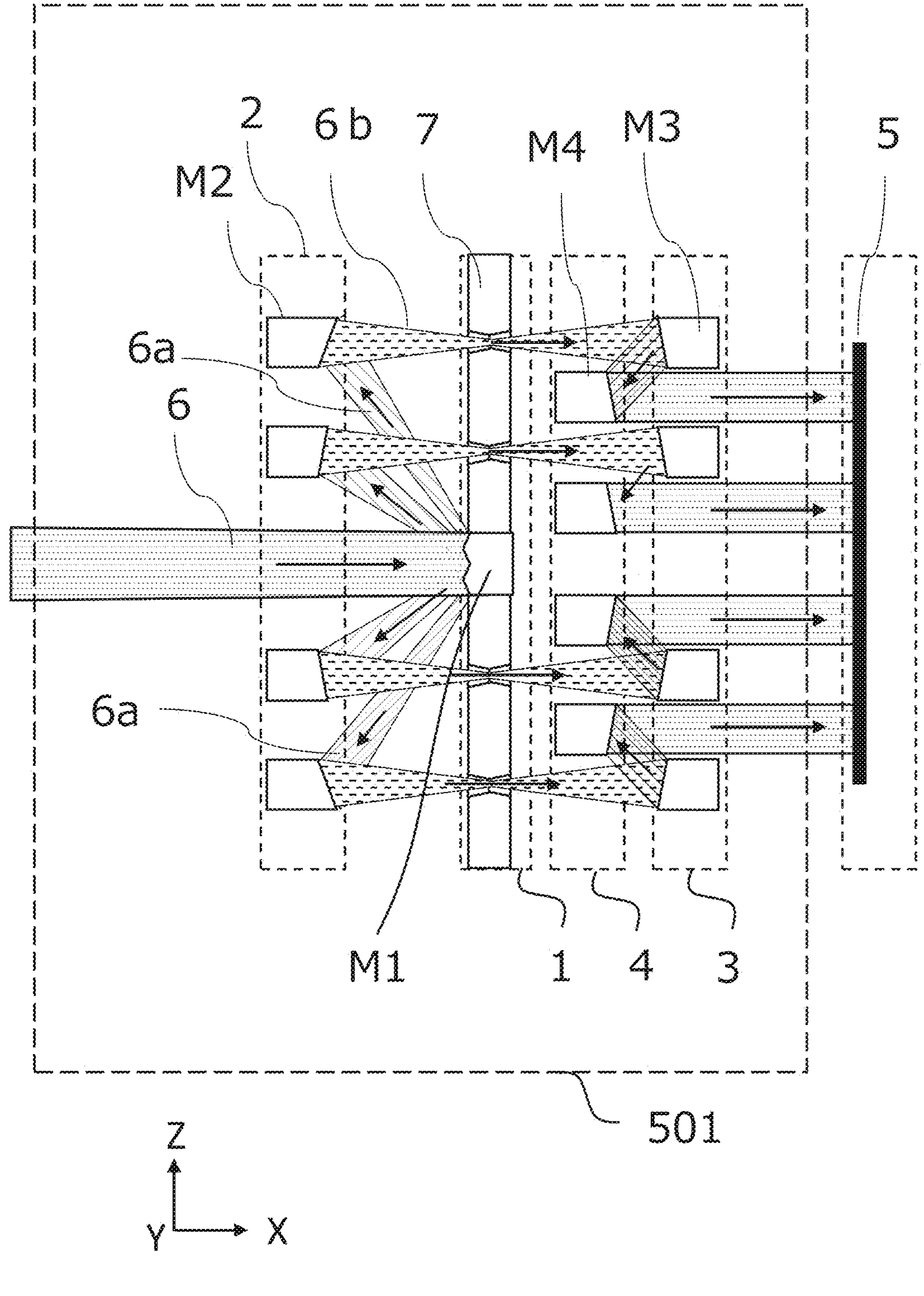
FIG. 1 is a schematic cross-sectional view for describing a configuration of a spectroscopic device according to a first embodiment.

An optical member, a spectroscopic device, and the like according to embodiments of the present disclosure will be described with reference to the drawings. The embodiments described below are merely examples, and for example, detailed configurations can be appropriately changed and implemented by those skilled in the art without departing from the gist of the present disclosure.

Note that, in the drawings referred to in the following embodiments and description, elements denoted by the same reference signs have similar functions unless otherwise specified. In the drawings, in a case where a plurality of the same elements are arranged, reference signs and a description thereof may be omitted.

In addition, the drawings may be schematic for convenience of illustration and description, and thus, the shape, size, arrangement, and the like of elements in the drawings may not strictly match those of actual ones. In addition, "XX or more and YY or less" or "XX to YY" representing a numerical range means a numerical range including end points XX (lower limit) and YY (upper limit) unless otherwise specified. When numerical ranges are described in stages, the upper limit and the lower limit of each numerical range can be arbitrarily combined.

Further, in the following description, for example, a +X direction indicates the same direction as that indicated by an X-axis arrow in the illustrated coordinate system, and a −X direction indicates a direction 180 degrees opposite to that indicated by the X-axis arrow in the illustrated coordinate system. In addition, a direction simply referred to as an X direction is a direction parallel to an X axis regardless of a difference from the direction indicated by the illustrated X-axis arrow. The same applies to directions other than the X direction.

First Embodiment

Overall Configuration

FIG. 1 is a schematic cross-sectional view for describing a configuration of a spectroscopic device according to a first embodiment. The spectroscopic device includes an optical member 1, an optical member 2, an optical member 3, an optical member 4, and a light receiving sensor 5. An optical system including the optical member 1, the optical member 2, the optical member 3, and the optical member 4 can also be referred to as a spectroscopic optical system 501. The optical member 1 is an optical member in which a light splitting mirror M1, which is a first mirror, and a stray light suppressing member 7 are integrated with each other. The optical member 2 is an optical member including a light transmitting portion that transmits incident light 6 and a plurality of second mirrors M2. The light transmitting portion can be implemented by an opening or a light-transmissive member, and FIG. 1 illustrates an example in which the opening is provided. The optical member 3 is an optical member including a plurality of third mirrors M3. In the present embodiment, a reflective diffraction grating can be used as the third mirror M3. The optical member 4 is an optical member including a plurality of fourth mirrors M4.

The incident light 6 that is an observation target travels in the +X direction and is incident on the light splitting mirror M1 in the device through the light transmitting portion of the optical member 2. A reflective surface of the light splitting mirror M1 is configured such that the incident light 6 is split into a plurality of light fluxes 6*a* and reflected in different directions. The optical member 1 and the optical member 2 are configured such that each of the light fluxes 6*a* reflected in different directions is directed to one of the plurality of dispersedly arranged second mirrors M2. The plurality of second mirrors M2 are arranged along a curved surface centered on an optical axis of the incident light 6. The number of light fluxes split by the light splitting mirror M1 and the number of second mirrors M2 are the same as each other.

Each of the light fluxes 6*a* reflected by the light splitting mirror M1 in different directions is incident on any one of the plurality of second mirrors M2 and reflected as a light flux 6*b* by the second mirror M2. An optical axis of each light flux 6*b* is parallel to the +X direction, and each light flux 6*b* passes through any one of a plurality of through holes of the stray light suppressing member 7 and is incident on any one of the plurality of third mirrors M3. Each of the plurality of second mirrors M2 is a concave mirror, and a shape of a reflective surface thereof is set such that the light flux 6*b* is condensed in the through hole of the stray light suppressing member 7. The third mirrors M3 are as many as the second mirrors M2 and are provided corresponding to the second mirrors M2. A configuration and an action of the stray light suppressing member 7 are described in detail below.

The reflective diffraction grating is provided on a reflective surface of each of the plurality of third mirrors M3, and is configured to reflect (diffract) a predetermined wavelength component of the incident light flux 6*b* toward any one of the plurality of fourth mirrors M4. The plurality of fourth mirrors M4 are arranged at intervals so as not to block an optical path until the light flux 6*b* having passed through the stray light suppressing member 7 is incident on the third mirror M3. In a case where the plurality of fourth mirrors M4 are integrated with each other to form the optical member 4, an opening for allowing the light flux 6*b* having passed through the stray light suppressing member 7 to pass is provided in the optical member 4. The fourth mirrors M4 are as many as the third mirrors M3 and are provided corresponding to the third mirrors M3.

A reflective surface of each of the plurality of fourth mirrors M4 is disposed so as to reflect a light flux of the predetermined wavelength component incident from the third mirror M3 toward a light receiving surface of the light receiving sensor 5. The light reflected by the fourth mirror M4 travels in the +X direction as a parallel light flux and irradiates the light receiving surface of the light receiving sensor 5. The plurality of third mirrors M3 are arranged at intervals so as not to block an optical path until measurement light reflected by the fourth mirror M4 is incident on the light receiving sensor 5. In a case where the plurality of third mirrors M3 are integrated with each other to form the optical member 3, an opening for allowing the measurement light reflected by the fourth mirror M4 to pass is provided in the optical member 3.

The light receiving sensor 5 is a sensor in which pixels sensitive to a wavelength of the incident measurement light are two-dimensionally arranged, and for example, a complementary metal-oxide-semiconductor (CMOS) sensor or a charge-coupled device (CCD) sensor is used. An information processing unit (not illustrated) acquires spectral image data of the incident light 6 based on an output signal of the light receiving sensor 5, and can perform information processing such as storing the spectral image data in a storage unit, transmitting the spectral image data to an external computer via a network, analyzing the observation target by image processing, and displaying an analyzed image.

Stray Light Suppressing Member

Figure 2:
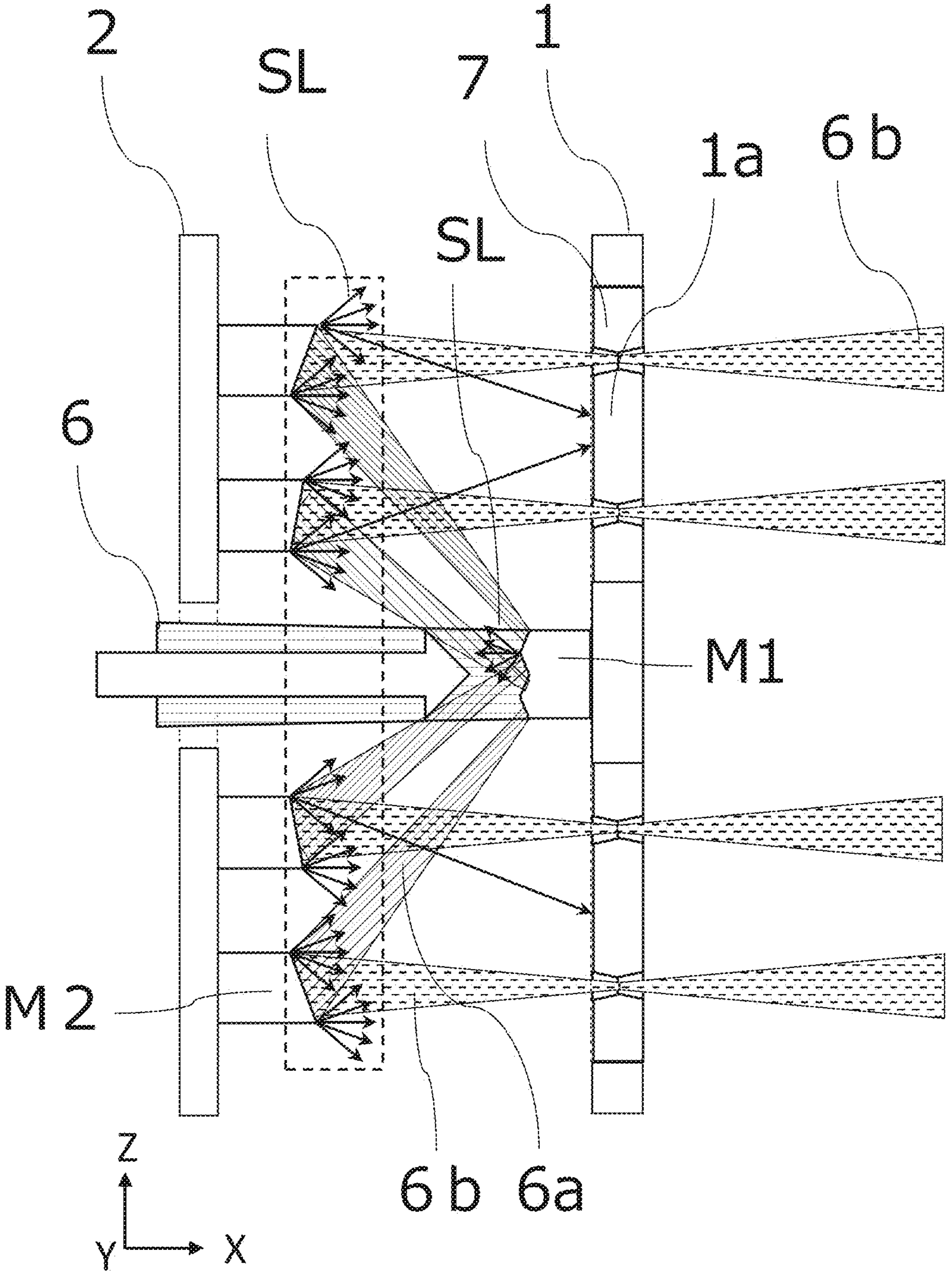
FIG. 2 is a partial cross-sectional view of the spectroscopic device for describing a cause of occurrence of stray light and an action of a stray light suppressing member.

Next, the stray light suppressing member 7 will be described. FIG. 2 is a partial cross-sectional view of the spectroscopic device for describing a cause of occurrence of stray light and the action of the stray light suppressing member 7.

As described above, the incident light 6 that is an observation target is incident on the light splitting mirror M1 in the device through the light transmitting portion of the optical member 2 and is split into the plurality of light fluxes 6*a* and reflected in different directions. Since the light splitting mirror M1 splits the incident light 6 into the plurality of light fluxes 6*a* and reflects the light fluxes 6*a* in different directions, the light splitting mirror M1 is implemented as a polyhedron in which the reflective surfaces having different orientations are combined. Since a boundary (an edge of the reflective surface) between the reflective surfaces having different orientations is not a geometrically ideal line having an infinitely small width but has a curved surface shape corresponding to realistic accuracy of a processing technique, the incident light 6 is scattered in various directions at the edge to become scattered light (stray light SL).

Each light flux 6*a* reflected by the light splitting mirror M1 is incident on the second mirror M2 and is reflected as the light flux 6*b* whose optical axis is parallel to the +X direction. Since an outer edge (edge) of the second mirror M2 does not have a geometrically ideal infinitely small corner but has a curved surface shape corresponding to realistic accuracy of a processing technique, the light flux 6*a* is scattered in various directions by the edge and becomes the scattered light (stray light SL).

Such the scattered light (stray light SL) travels in a direction different from an optical path through which observation light is to originally travel, and is reflected by a member in the spectroscopic device and becomes the stray light. When the stray light reaches and is detected by the light receiving sensor 5, the stray light becomes noise, which causes a decrease in spectral accuracy of the spectroscopic device. The spectroscopic device according to the present embodiment includes the compact stray light suppressing member 7 that allows the observation light to pass and attenuates the stray light by multiple reflections.

Figure 3:
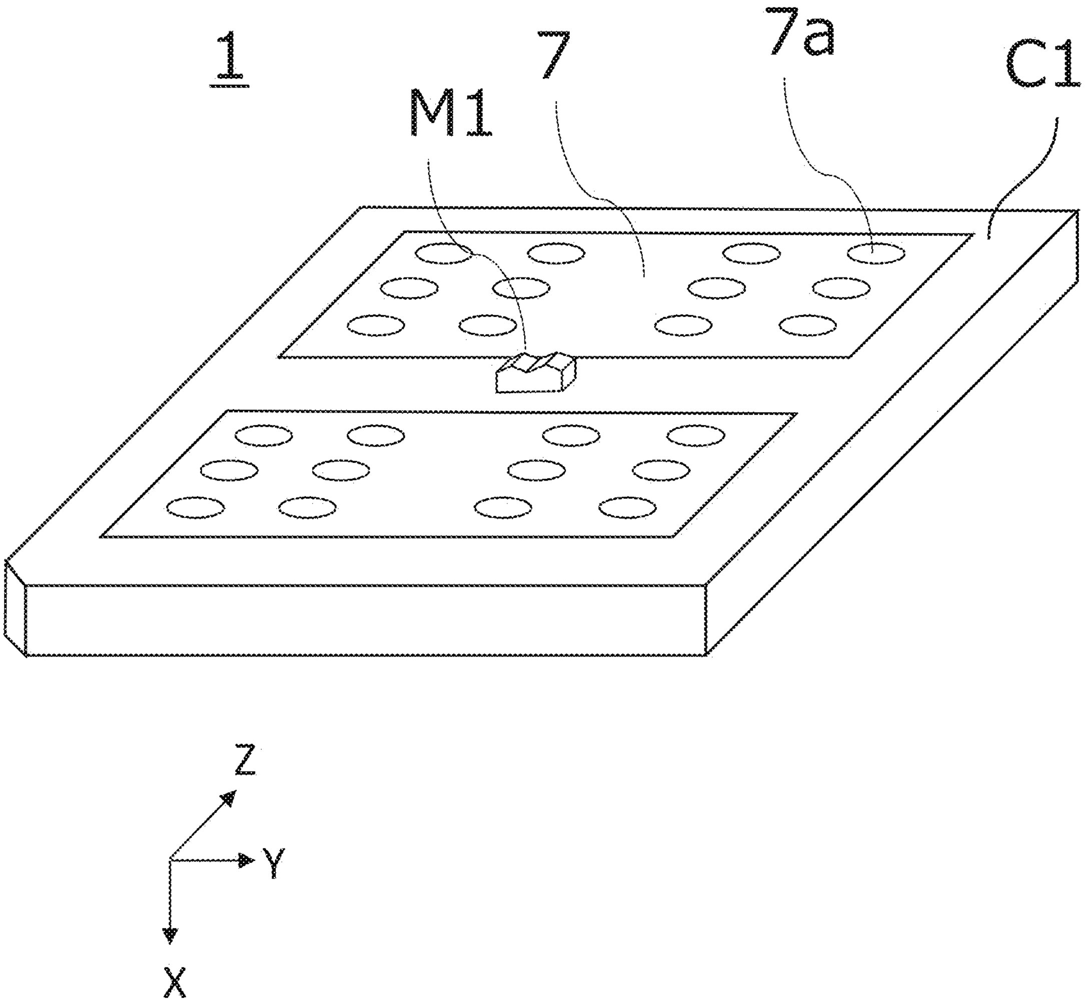
FIG. 3 is an external perspective view of an optical member in which the stray light suppressing member and a light splitting mirror are integrated with each other.

FIG. 3 is an external perspective view of the optical member 1 in which the stray light suppressing member 7 and the light splitting mirror M1 are integrated with each other. In the present embodiment, the light splitting mirror M1 and the stray light suppressing member 7 are fixed to a casing C1 of the optical member 1 as illustrated in FIG. 3 in order to enable easy installation of the stray light suppressing member 7 with high relative positional accuracy with respect to other optical members. A structure different from the above may be installed as long as the stray light suppressing member 7 can be fixed at an appropriate position in an optical system of the spectroscopic device.

Figure 4:
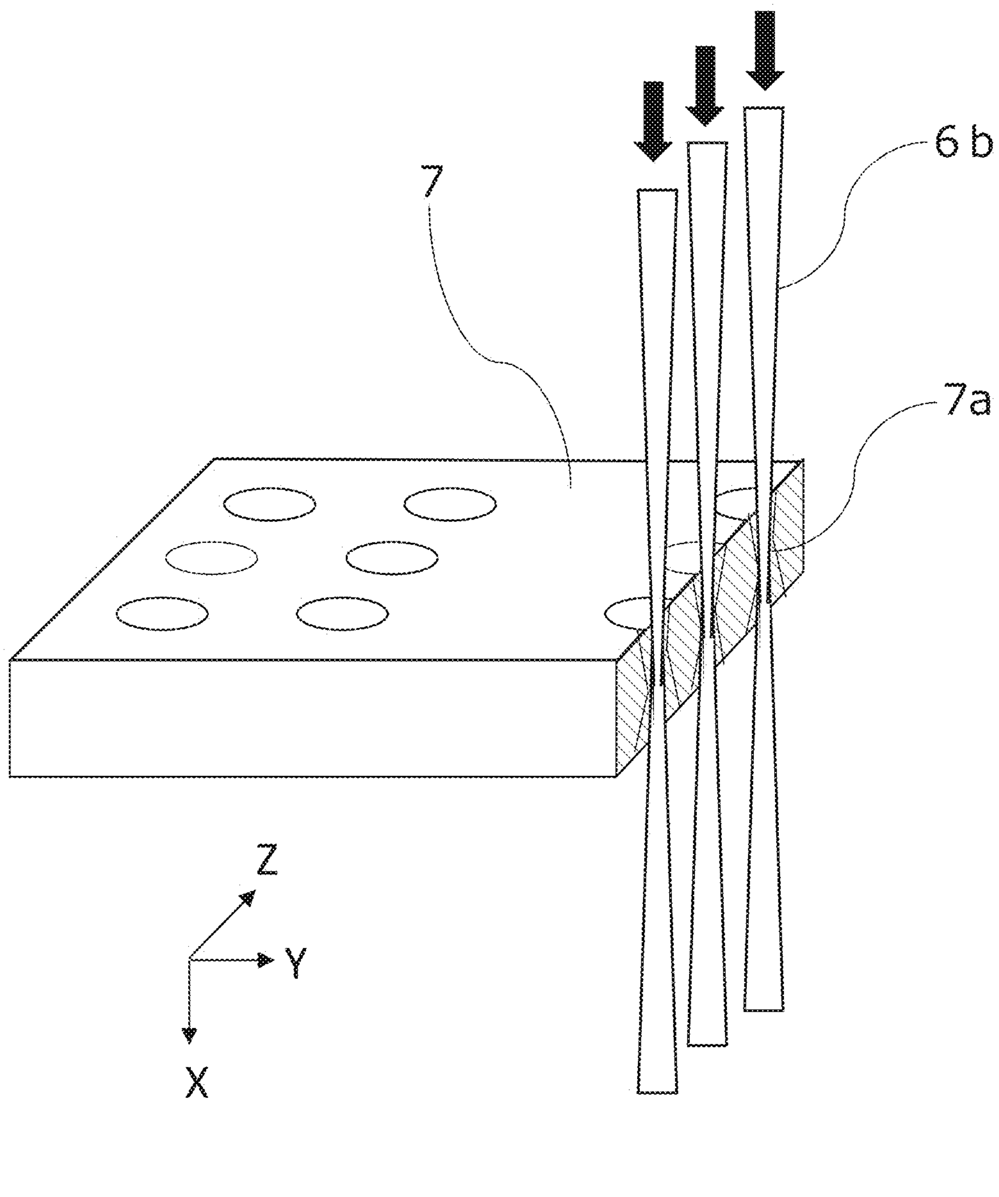
FIG. 4 is a schematic diagram illustrating a situation in which a light flux of observation light passes through a through hole of the stray light suppressing member.

FIG. 4 is a schematic diagram schematically illustrating a situation in which the light flux 6*b* of the observation light passes through a through hole 7*a* of the stray light suppressing member 7. As illustrated in FIG. 4, the stray light suppressing member 7 has a plurality of through holes 7*a* through which the light fluxes 6*b* reflected from the respective second mirrors M2 individually pass. The stray light suppressing member 7 is installed such that a position where the light flux 6*b* reflected by the second mirror M2, which is a concave mirror, is condensed is within the through hole 7*a*.

For example, an invar material, a metal such as aluminum or stainless steel, or a ceramic such as silicon nitride can be used as a base of the stray light suppressing member 7. An outer surface of the stray light suppressing member 7 and a wall surface of the through hole 7*a* are subjected to blackening treatment for a light absorption (attenuation) effect. For the blackening treatment, an appropriate treatment method can be selected according to a wavelength band of the observation light and a material type of the stray light suppressing member. For example, nickel or chromium may be used for the blackening treatment, black alumite may be used, or black surface treatment by electroless plating can be used.

Figure 5:
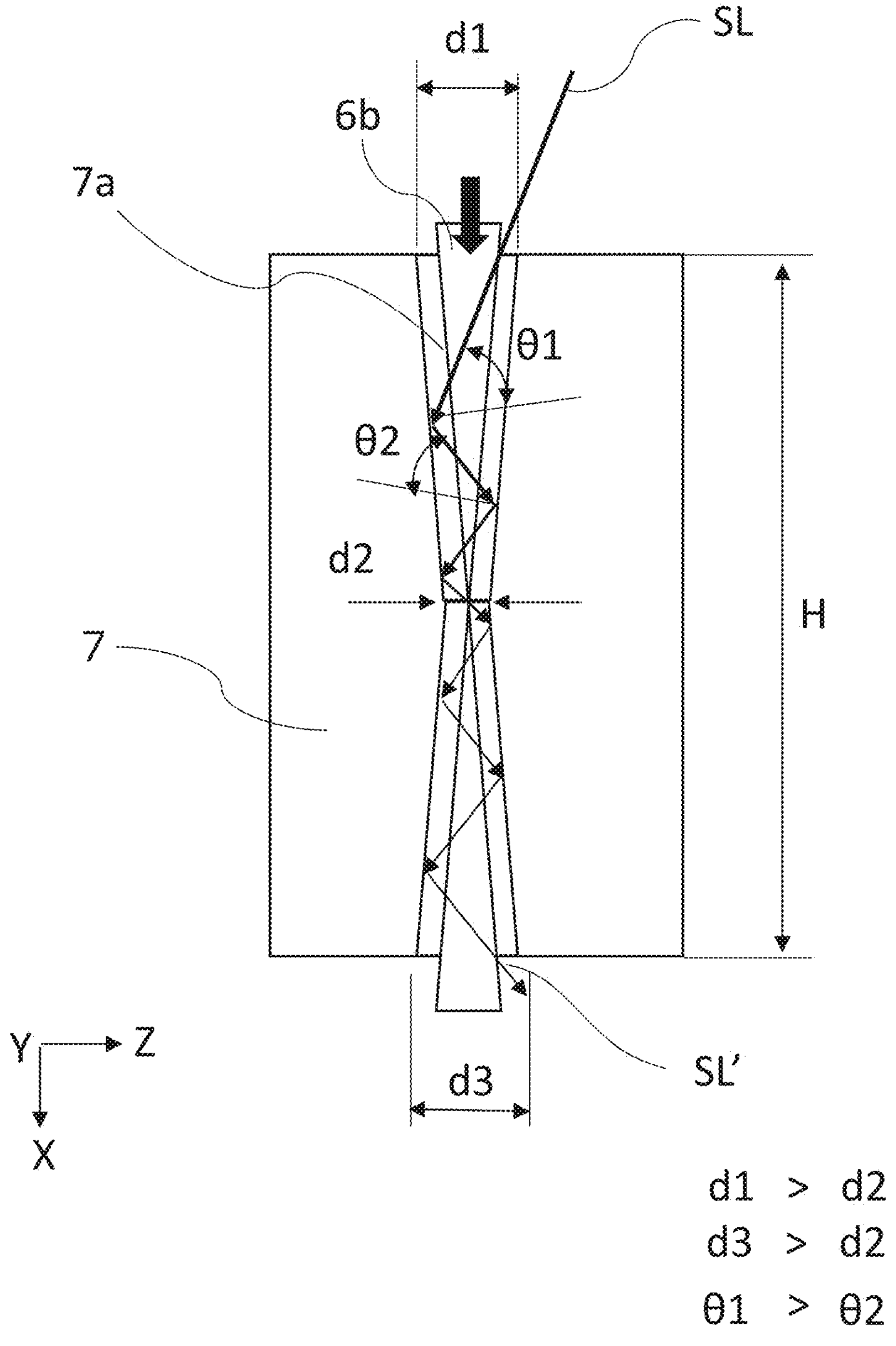
FIG. 5 is a partial cross-sectional view illustrating one of the through holes of the stray light suppressing member according to the embodiment.

FIG. 5 is a partial cross-sectional view illustrating one of the through holes 7*a* of the stray light suppressing member 7 according to the present embodiment, and illustrates the light flux 6*b* (observation light) and the stray light SL incident into the through hole 7*a*. The through hole 7*a* has an inner diameter that does not interfere with the light flux 6*b* at any position in the X direction. However, a columnar space having a constant inner diameter is not defined. An inner wall defining a space of the through hole 7*a* is an inclined surface inclined with respect to an optical axis direction (that is, the X direction) of the light flux 6*b*. The inner diameter of the through hole gradually decreases from d1 to d2 (d1>d2), and then gradually increases from d2 to d3 (d3>d2) when the through hole 7*a* is viewed in the X direction, in which d1 represents a diameter of an entrance port through which the light flux 6*b* is incident, and d3 represents a diameter of an exit port through which the light flux 6*b* exits.

Figure 6:
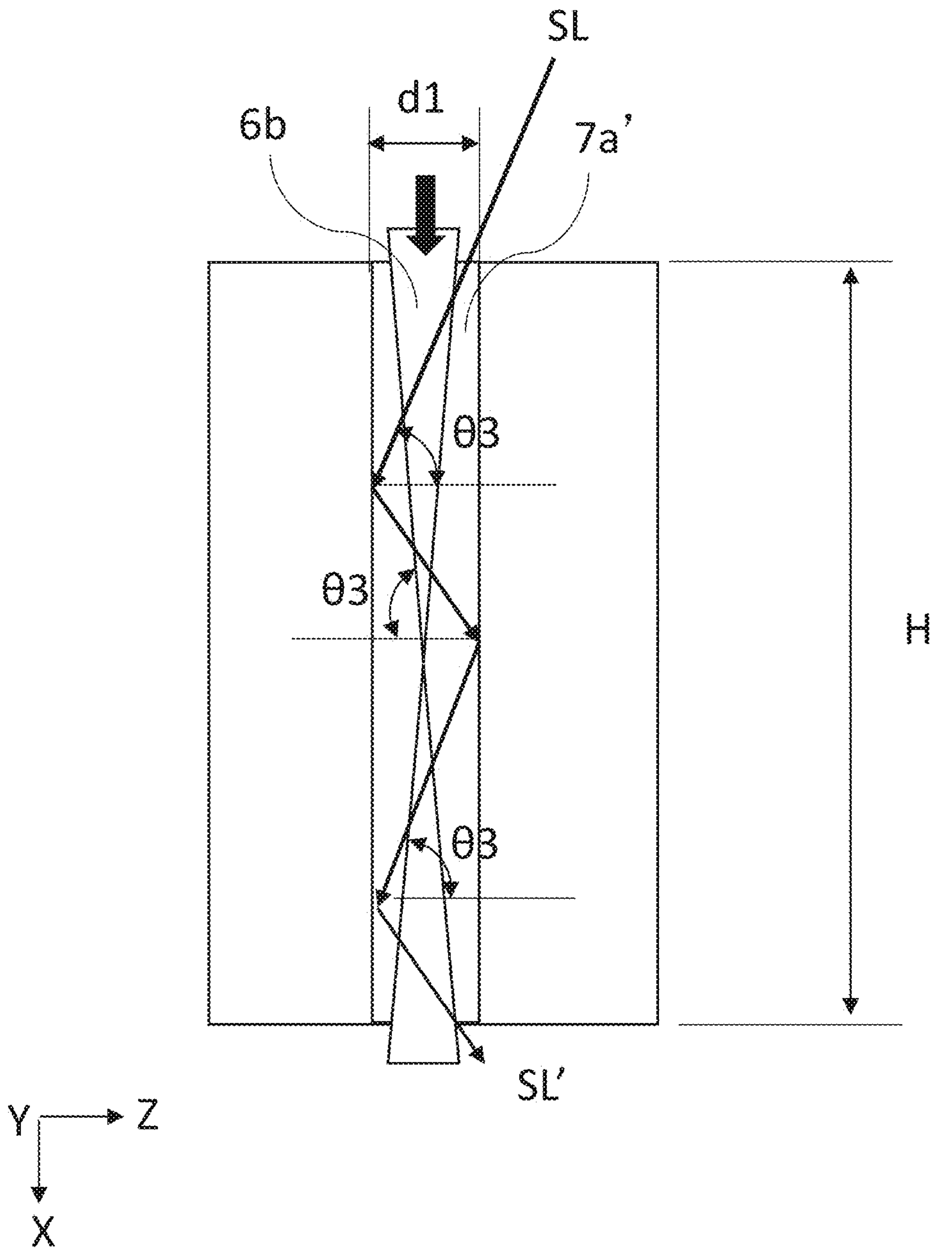
FIG. 6 is a partial cross-sectional view illustrating one of through holes of a member according to a reference embodiment.

FIG. 6 illustrates, as a reference embodiment, a member in which a columnar space having a constant inner diameter at any position in the X direction is defined as a through hole 7*a'*.

As illustrated in FIGS. 5 and 6, the stray light SL is incident on the through hole from a direction different from the X direction which is the optical axis direction of the light flux 6*b* (observation light). In general, on a blackened surface, a reflectance increases as an incident angle of the light increases, that is, as the light is incident at an angle closer to being parallel to the reflective surface.

In the reference embodiment of FIG. 6, the stray light SL entering the through hole 7*a'* at a large incident angle θ3 is reflected with a relatively high reflectance when colliding with a wall surface. Then, the stray light SL is incident on the wall surface again at the incident angle θ3 and is reflected with a relatively high reflectance. Such incidence and reflection are repeated in the through hole 7$a'$, but the stray light SL incident at the large incident angle θ3 is reflected with a relatively high reflectance and thus is hardly attenuated. In addition, since an incident angle θ at the time of reflection by the wall surface does not change with each reflection, the stray light SL reaches an exit of the through hole 7$a'$ by three times of reflection in the example of FIG. 6. Therefore, the stray light SL exits as stray light SL' from the exit of the through hole 7$a'$ without being sufficiently reduced in intensity.

On the other hand, the stray light suppressing member 7 according to the present embodiment of FIG. 5 is configured such that the wall surface of the through hole 7*a* is inclined with respect to the optical axis of the light flux 6*b* (observation light). In a case where the stray light SL is incident on the through hole from the same direction as in the reference embodiment, in the present embodiment, an incident angle θ1 with respect to the wall surface can be made smaller than the incident angle θ3 in the reference embodiment (θ1<θ3). Furthermore, in the present embodiment, an angle formed between a traveling direction of the stray light SL and the optical axis of the light flux 6*b* changes with each reflection. Therefore, even in a case where a length H of the member in the optical axis direction of the light flux 6*b* (observation light) is the same, the present embodiment can increase the number of times the stray light SL is reflected by the wall surface of the through hole as compared with the reference embodiment. In the example of FIG. 5, the stray light SL is reflected by the wall surface seven times before reaching the exit of the through hole 7*a*. Furthermore, since an incident angle θ2 in the second reflection can be made smaller than the incident angle θ1 in the first reflection (θ2<θ1), a reflectance in the second reflection can be made lower than a reflectance in the first reflection.

As described above, according to the present embodiment, the incident angle of the stray light SL with respect to the wall surface in the through hole 7*a* can be reduced and the number of times the reflection is made in the through hole 7*a* can be increased, and thus, the intensity of the stray light SL' reaching the exit of the through hole 7*a* is sufficiently reduced.

A shape of the through hole can be set by, for example, the following guideline. Here, an assumed incident angle of the stray light is denoted by θ, a reflectance with respect to the incident angle θ at an observation wavelength of the stray light suppressing member is denoted by K, a desired attenuation rate of the stray light is denoted by A %, and the number of times reflection is required to be made is denoted by n. The number of times reflection is required to be made on the wall surface can be obtained by the following approximate expression shown as Expression 1.

$$K^n \leq A \quad \text{(Expression 1)}$$

In practice, the incident angle decreases every time the stray light is reflected by the wall surface, and the reflectance of the stray light decreases little by little. Therefore, a sufficient attenuation effect is obtained by the number n of times reflection is to be made determined by Expression 1.

The number n of times reflection is required to be made on the wall surface can be determined as a function in which an opening diameter of an entrance of the through hole is d1, a diameter of the narrowest portion is d2, an opening diameter of the exit is d3, and the thickness of the stray light suppressing member is H.

$$n = f(\theta, d1, d2, d3, H) \quad \text{(Expression 2)}$$

Here, the attenuation rate of the stray light in the embodiment and the reference embodiment will be described with specific examples. It is assumed that a wavelength band of light to be observed is an infrared range (a wavelength of 800 nm to 2500 nm), a diameter of the observation light incident on the stray light suppressing member is 0.2 (mm), and an entry angle of the stray light into the stray light suppressing member (an angle with respect to the optical axis of the observation light) is 7 degrees. In addition, it is assumed that a reflectance of an inner wall surface of the stray light suppressing member subjected to black alumite treatment under the condition of the incident angle of 83 (degrees) is 40%.

In a case where it is desired to attenuate the stray light to 1% or less in the stray light suppressing member, the number of times reflection is required to be made on the wall surface is n=6 or more according to Expression 1.

In the embodiment, dimensions of each portion of the through hole 7*a* of the stray light suppressing member 7 can be set to d1=0.3 (mm), d2=0.1 (mm), d3=0.3 (mm), and H=8.0 (mm), for example, in order to set the number of times reflection required to be made on the wall surface to n=6 or more. Then, the number of times the stray light SL is reflected in the through hole 7*a* is seven as illustrated in FIG. 5, and the attenuation rate of the stray light SL' exiting through the exit with respect to the stray light SL incident through the entrance is 0.16% according to Expression 1.

On the other hand, in the reference embodiment of FIG. 6, in a case where H=8 (mm) and d1=0.3 (mm), the number of times the stray light SL is reflected in the through hole is three as illustrated in FIG. 6, and the attenuation rate remains at 6.4%.

As described above, the stray light suppressing member according to the embodiment has a significantly greater effect of attenuating the stray light as compared with the reference embodiment with the same thickness and the same opening diameter. Therefore, it is possible to provide the compact spectroscopic device in which noise caused by the stray light is suppressed and the spectral accuracy is high.

Figure 7:
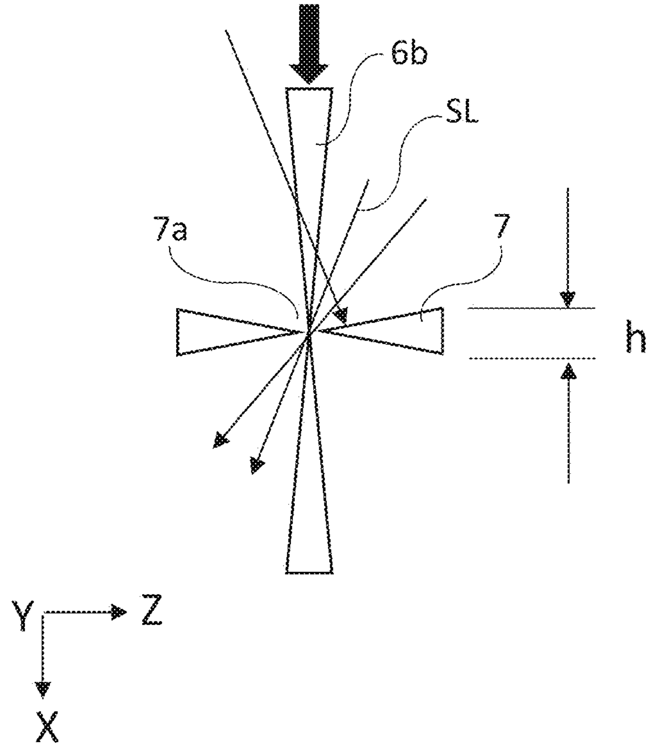
FIG. 7 is a view illustrating a so-called diaphragm or slit.

The present embodiment is provided to reflect the stray light SL incident through a first opening toward a second opening at least once on the wall surface in the through hole, and preferably reflects the stray light SL a plurality of times on the wall surface in the through hole to attenuate the stray light SL. Therefore, a shape having a small thickness h as illustrated in FIG. 7, such as a so-called diaphragm or slit, is outside the scope of the embodiment. This is because, in the shape of FIG. 7, the stray light SL is allowed to pass through the opening without being reflected a plurality of times by the inner wall surface of the through hole even in a case where the through hole has an inclined wall surface. In this regard, the present embodiment satisfies, for example, H>d1 and H>d3 in FIG. 5.

Figure 8:
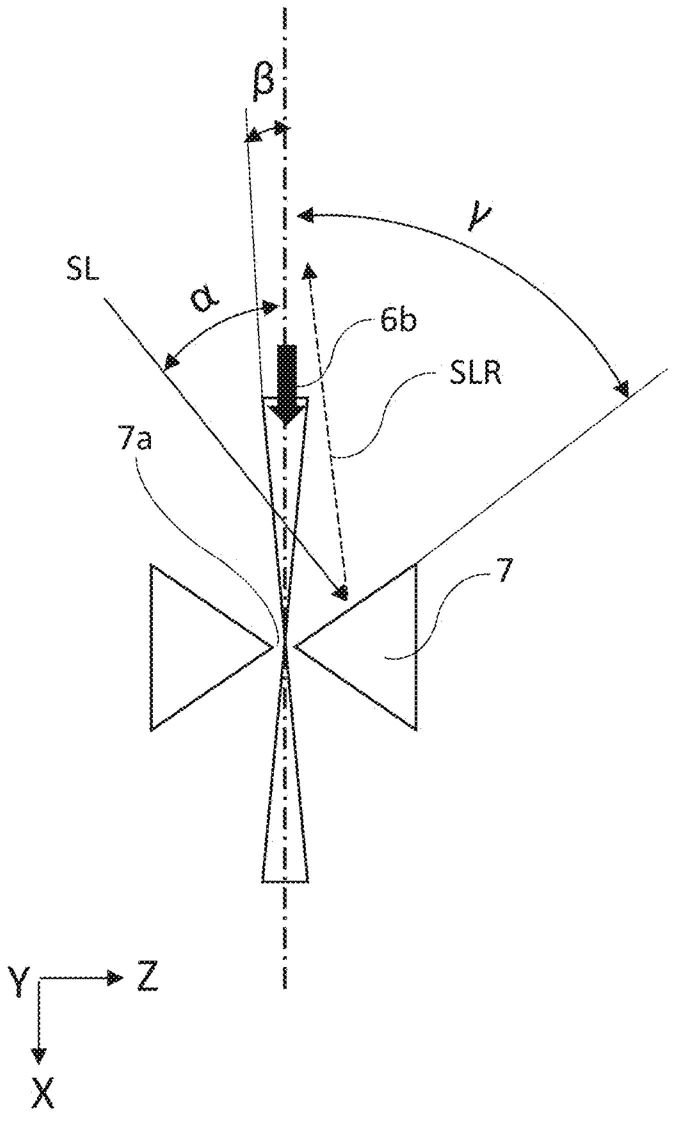
FIG. 8 is a view schematically illustrating a state in which the stray light is incident on an inclined surface of the stray light suppressing member.

In addition, in a case where a wall surface inclined with respect to the optical axis direction of the observation light is provided in the through hole, it is not preferable to incline the wall surface so as to reflect the incident stray light in an unpreferable direction. FIG. 8 schematically illustrates a state in which the stray light SL is incident on the inclined surface of the stray light suppressing member 7. It is assumed that the stray light SL inclined at an angle $\alpha$ with respect to the optical axis of the light flux 6*b* of the observation light is incident. When an angle formed by the wall surface of the through hole and the optical axis of the light flux 6*b* of the observation light is an inclination angle $\gamma$, the inclination angle $\gamma$ is desirably smaller than $90°-\alpha$ ($\gamma<90°-\alpha$). This is because when the inclination angle $\gamma$ of the wall surface becomes larger than $90°-\alpha$, the stray light SL is reflected by the wall surface in a direction indicated by a dotted line to become stray light SLR as illustrated in FIG. 8, and returns toward the second mirror M2 (FIG. 1), as a result of which further stray light occurs, which may decrease the spectral accuracy. In addition, when a light condensing angle of the light flux 6*b* is $\beta$, the inclination angle $\gamma$ of the wall surface is preferably $\beta$ or more ($\gamma\geq\beta$) in order to prevent the light flux 6*b* of the observation light and the wall surface of the through hole from interfering with each other.

Manufacturing Method

Next, a manufacturing method for the stray light suppressing member 7 will be described. For example, an aluminum material (A5052) having a thickness of H is prepared, a through hole having a predetermined shape is formed at a predetermined position by wire cut discharge, and then black alumite treatment is performed to manufacture the stray light suppressing member 7. The completed stray light suppressing member 7 is fixed to the casing C1 of the optical member 1 illustrated in FIG. 3 by, for example, a set screw.

The material of the stray light suppressing member is not limited to aluminum, and may be, for example, a metal such as invar or SUS, or a ceramic. In addition, a method of forming the through hole is not limited to the wire cut discharge, and a substrate may be cut from both front and back sides by using a cutting tool such as an end mill such that the through hole penetrates through the substrate, depending on the shape and size of the through hole. The blackening treatment for enhancing the light absorption effect may be other than the black alumite treatment. For example, a paint may be applied.

Modified Example

Next, modified examples of the stray light suppressing member 7 according to the embodiment will be described. FIGS. 9A to 9E are partial cross-sectional views illustrating one of through holes 7*a* of different modified examples of the stray light suppressing member 7. Similarly to FIG. 5, FIGS. 9A to 9E illustrate behavior of the light flux 6*b* (observation light) and the stray light SL incident into the through hole 7*a*.

Similarly to the embodiment illustrated in FIG. 5, each of the modified examples illustrated in FIGS. 9A to 9E is an optical member (stray light suppressing member) that has a through hole penetrating from a first opening to a second opening and causes the light flux 6*b* of the observation light to be incident through the first opening so as to be condensed in the through hole and to exit through the second opening. In any case, an inner wall surface of the through hole includes an inclined wall surface inclined with respect to the optical axis (X axis) of the light flux 6*b* such that a portion having an inner diameter smaller than that of the first opening is disposed between the first opening and the second opening. The inclined wall surface does not interfere with the light flux 6*b* of the observation light condensed in the through hole, and the stray light SL incident on the first opening from a direction different from the optical axis (X axis) of the light flux 6*b* of the observation light is reflected at least a plurality of times and attenuated until reaching the second opening.

Among the modified examples illustrated in FIGS. 9A to 9E, in the modified examples illustrated in FIGS. 9A to 9D, a portion having an inner diameter smaller than that of the first opening and smaller than that of the second opening is disposed in the middle of the through hole.

Figure 9E:
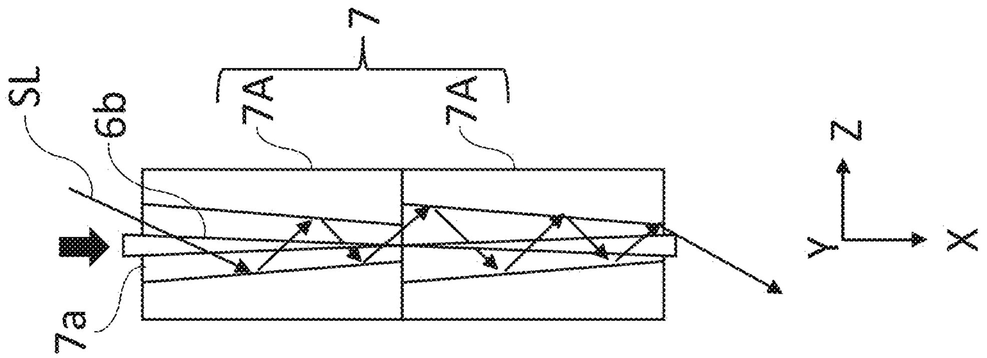
FIG. 9E is a view illustrating a through hole according to another modified example.
Figure 9D:
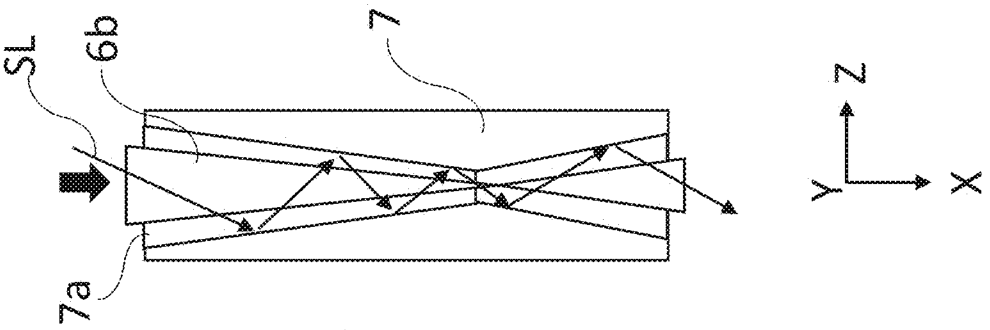
FIG. 9D is a view illustrating a through hole according to another modified example.
Figure 9C:
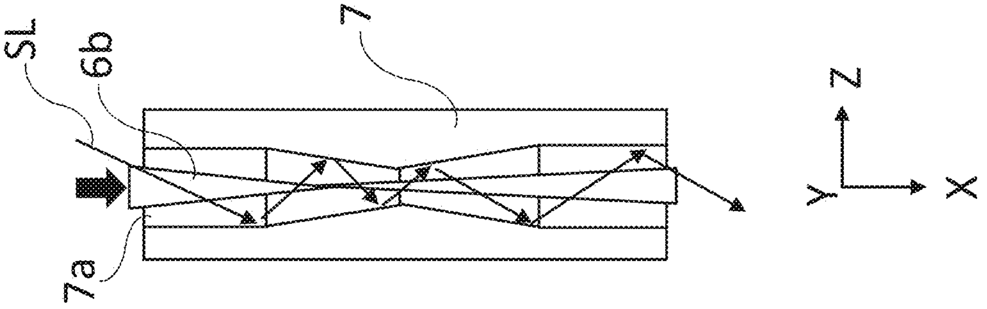
FIG. 9C is a view illustrating a through hole according to another modified example.
Figure 9B:
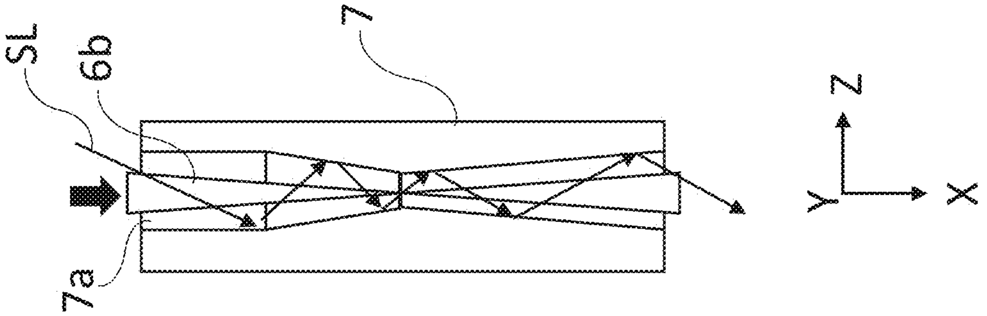
FIG. 9B is a view illustrating a through hole according to another modified example.
Figure 9A:
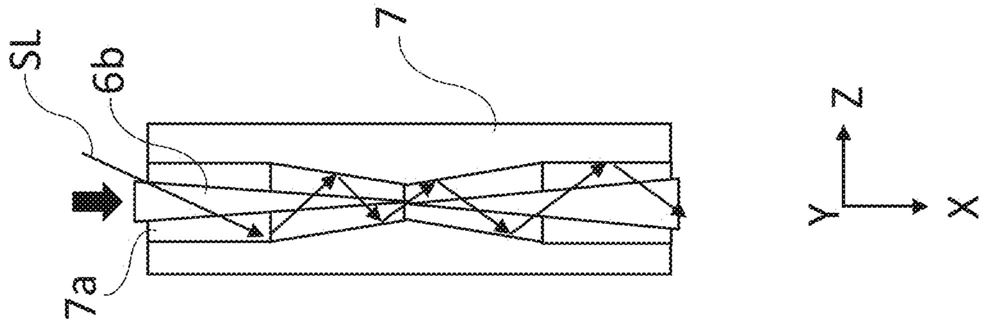
FIG. 9A is a view illustrating a through hole according to a modified example.

In the modified example illustrated in FIG. 9A, a region having a constant opening diameter, that is, a region whose inner wall surface is parallel to the optical axis (X axis) of the light flux 6*b* is disposed on each of a first opening side on which the light flux 6*b* of the observation light is incident and a second opening side on which the light flux 6*b* exits. The inclined wall surface inclined with respect to the optical axis (X axis) of the light flux 6*b* is provided between the two regions. The portion having an inner diameter smaller than that of the first opening and smaller than that of the second opening is disposed in the middle of the through hole. Also in this modified example, the inner wall surface of the through hole does not interfere with the light flux 6*b* of the observation light condensed in the through hole, and the stray light SL incident on the first opening from a direction different from the optical axis (X axis) of the light flux 6*b* of the observation light is reflected a plurality of times and attenuated until reaching the second opening.

In the modified example illustrated in FIG. 9B, a region having a constant opening diameter, that is, a region whose inner wall surface is parallel to the optical axis (X axis) of the light flux 6*b* is disposed only on the first opening side on which the light flux 6*b* of the observation light is incident. The inclined wall surface inclined with respect to the optical axis (X axis) of the light flux 6*b* is provided in the other region. The portion having an inner diameter smaller than that of the first opening and smaller than that of the second opening is disposed in the middle of the through hole. Also in this modified example, the inner wall surface of the through hole does not interfere with the light flux 6*b* of the observation light condensed in the through hole, and the stray light SL incident on the first opening from a direction different from the optical axis (X axis) of the light flux 6*b* of the observation light is reflected a plurality of times and attenuated until reaching the second opening.

In the modified example illustrated in FIG. 9C, similarly to the modified example of FIG. 9A, a region having a constant opening diameter, that is, a region whose inner wall surface is parallel to the optical axis (X axis) of the light flux 6*b* is disposed on each of the first opening side on which the light flux 6*b* of the observation light is incident and the second opening side on which the light flux 6*b* exits. The inclined wall surface inclined with respect to the optical axis (X axis) of the light flux 6*b* is provided between the two regions. The portion having an inner diameter smaller than that of the first opening and smaller than that of the second opening is disposed in the middle of the through hole. In the modified example of FIG. 9A, a position where the inner diameter of the through hole is minimized matches a position where the light flux 6*b* is condensed when viewed in the optical axis direction of the light flux 6*b*. On the other hand, in the modified example illustrated in FIG. 9C, a layout is set such that the position where the light flux 6*b* is condensed is closer to the first opening side than the position where the inner diameter of the through hole is minimized. In some cases, a layout may be set such that the position where the light flux 6*b* is condensed is closer to the second opening side than the position where the inner diameter of the through hole is minimized. Also in this modified example, the inner wall surface of the through hole does not interfere with the light flux 6*b* of the observation light condensed in the through hole, and the stray light SL incident on the first opening from a direction different from the optical axis (X axis) of the light flux 6*b* of the observation light is reflected a plurality of times and attenuated until reaching the second opening.

In the modified example illustrated in FIG. 9D, similarly to the embodiment illustrated in FIG. 5, the inner wall surface of the through hole includes the inclined wall surface inclined with respect to the optical axis of the light flux 6*b* such that the portion having an inner diameter smaller than those of the first opening and the second opening is disposed between the first opening and the second opening. In the embodiment of FIG. 5, a portion where the inner diameter of the through hole is minimized is disposed at the center between the first opening and the second opening in the optical axis direction of the light flux 6*b*. On the other hand, in the modified example illustrated in FIG. 9D, the portion where the inner diameter of the through hole is minimized is disposed at a position closer to the second opening than to the first opening. In some cases, the portion where the inner diameter of the through hole is minimized may be disposed at a position closer to the first opening than to the second opening. Also in this modified example, the inner wall surface of the through hole does not interfere with the light flux 6*b* of the observation light condensed in the through hole, and the stray light SL incident on the first opening from a direction different from the optical axis (X axis) of the light flux 6*b* of the observation light is reflected a plurality of times and attenuated until reaching the second opening.

In the modified example illustrated in FIG. 9E, the inner wall surface of the through hole includes the inclined wall surface inclined with respect to the optical axis of the light flux 6*b* such that a portion having an inner diameter smaller than that of the first opening is disposed between the first opening and the second opening. The stray light suppressing member 7 in FIG. 9E includes two members 7A provided with tapered through holes (inclined wall surfaces). It is possible to easily manufacture the stray light suppressing member 7 by preparing and stacking the two members 7A provided with the tapered through holes (inclined wall surfaces). In addition, the number of members to be stacked is not limited to two, and more members may be stacked. Also in this modified example, the inner wall surface of the through hole does not interfere with the light flux 6*b* of the observation light condensed in the through hole, and the stray light SL incident on the first opening from a direction different from the optical axis (X axis) of the light flux 6*b* of the observation light is reflected a plurality of times and attenuated until reaching the second opening.

Next, a shape of the through hole 7*a* in a direction orthogonal to the optical axis of the light flux 6*b* will be described with a plurality of examples. A cross-sectional shape of the through hole when the stray light suppressing member is cut along a plane orthogonal to the optical axis of the light flux 6*b* can be similar at any position from the first opening through which the light flux 6*b* of the observation light is incident to the second opening through which the light flux 6*b* exits. FIGS. 10A to 10G illustrate the shape of the through hole in the direction orthogonal to the optical axis of the light flux 6*b*. The illustrated shape can be a shape of the first opening (incident side), a shape of a portion where the inner diameter is minimized in the through hole, or a shape of the second opening (exit side).

Figure 10A:
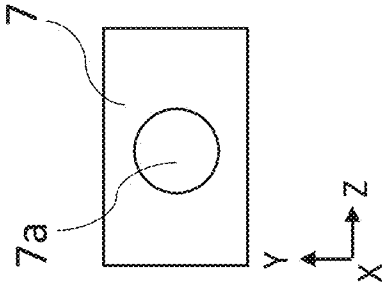
FIG. 10A illustrates an example in which a shape of the through hole is a circular shape.
Figure 10B:
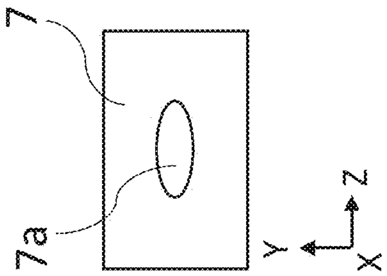
FIG. 10B illustrates an example in which the shape of the through hole is an elliptical shape.
Figure 10C:
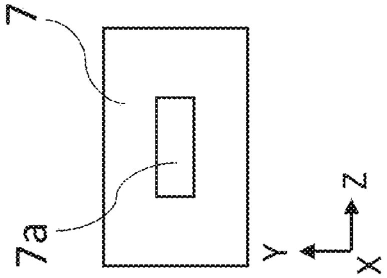
FIG. 10C illustrates an example in which the shape of the through hole is a rectangular shape.
Figure 10D:
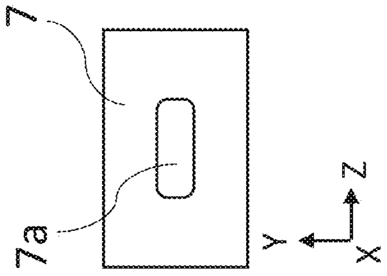
FIG. 10D illustrates an example in which the shape of the through hole is a rectangular shape with rounded corners.
Figure 10E:
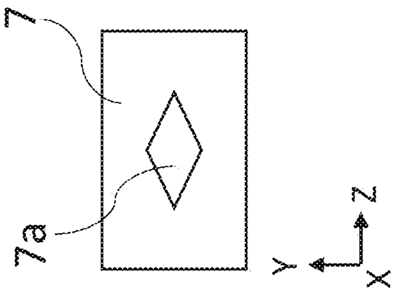
FIG. 10E illustrates an example in which the shape of the through hole is a rhombus shape.
Figure 10F:
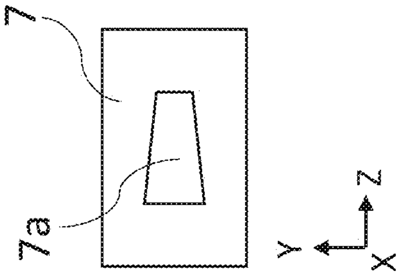
FIG. 10F illustrates an example in which the shape of the through hole is a trapezoidal shape.
Figure 10G:
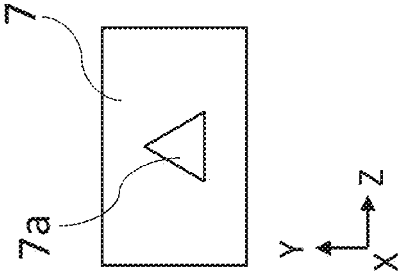
FIG. 10G illustrates an example in which the shape of the through hole is a triangular shape.

FIG. 10A illustrates a circular shape, FIG. 10B illustrates an elliptical shape, FIG. 10C illustrates a rectangular shape, FIG. 10D illustrates a rectangular shape with rounded corners, FIG. 10E illustrates a rhombus shape, FIG. 10F illustrates a trapezoidal shape, and FIG. 10G illustrates a triangular shape. The shape of the through hole can be appropriately set according to a cross-sectional shape taken in the direction orthogonal to the optical axis of the light flux 6*b* of the observation light, a condensing angle of the light flux 6*b*, an entry angle when the stray light SL enters the through hole, and the like.

Second Embodiment

A configuration of a spectroscopic device according to a second embodiment will be described. In the spectroscopic optical system 501 according to the first embodiment described with reference to FIG. 1, the stray light suppressing member 7 is disposed at the same position as the light splitting mirror M1 in the traveling direction (X direction) of the light flux 6*b* reflected by the second mirror M2. The stray light suppressing member according to the present disclosure is not necessarily disposed at the same position as in the first embodiment as long as the stray light suppressing member can reflect and attenuate the stray light many times without interfering with the observation light.

Figure 11:
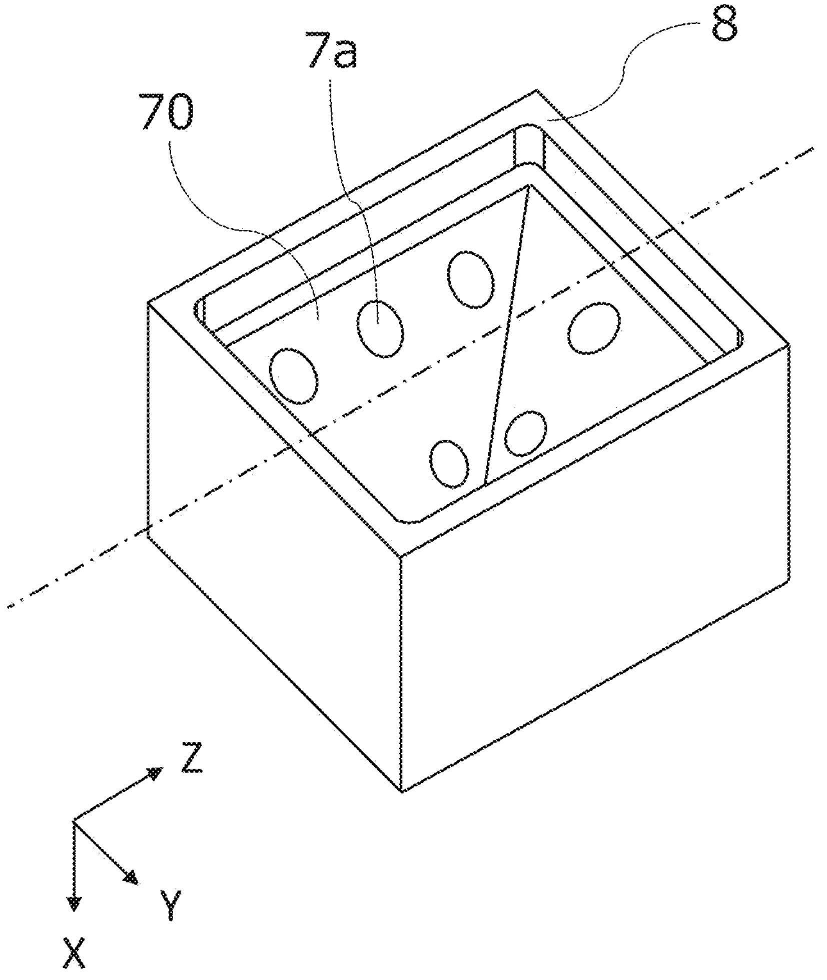
FIG. 11 is an external perspective view of a stray light suppressing member used in a spectroscopic device according to a second embodiment.
Figure 12:
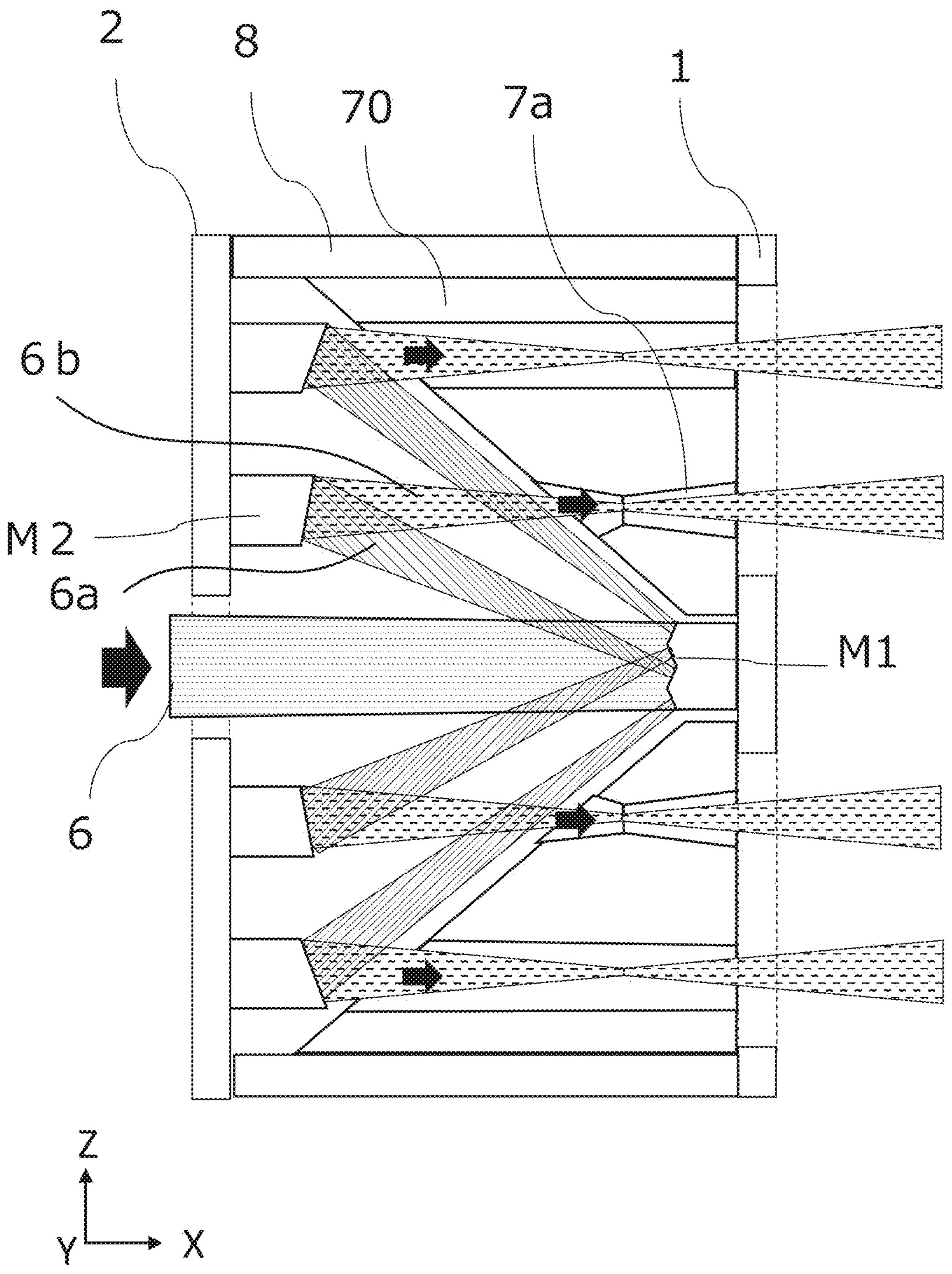
FIG. 12 is a partial cross-sectional view of the spectroscopic device according to the second embodiment.

In the second embodiment, a stray light suppressing member 70 is disposed between the second mirror M2 and a light splitting mirror M1 in a traveling direction (X direction) of a light flux 6*b* reflected by a second mirror M2. FIG. 11 is an external perspective view of the stray light suppressing member 70 used in the spectroscopic device according to the second embodiment, and FIG. 12 is a partial cross-sectional view of the spectroscopic device according to the second embodiment. FIG. 12 corresponds to a partial cross-sectional view of the spectroscopic device taken in a direction parallel to a ZX plane along a line with alternate long and short dashes of FIG. 11. A description of elements common to the first embodiment will be simplified or omitted.

The stray light suppressing member 70 is fixed to a casing 8 that supports an optical member 1 and an optical member 2, and is fixed so as to have a predetermined positional relationship with respect to the light splitting mirror M1 and the second mirror M2.

As illustrated in FIG. 11, a base of the stray light suppressing member 70 has a recessed portion recessed in a quadrangular pyramid shape in the X direction. As illustrated in FIG. 12, the light splitting mirror M1 is disposed at a bottom of the recessed portion recessed in the quadrangular pyramid shape. The recessed portion of the stray light suppressing member 70 functions as an optical path space through which incident light 6 traveling toward the light splitting mirror M1 in the +X direction and a plurality of light fluxes 6*a* traveling from the light splitting mirror M1 toward the second mirrors pass.

The base of the stray light suppressing member 70 is provided with a plurality of through holes 7*a* for allowing a plurality of light fluxes 6*b* reflected by the second mirrors M2 and having an optical axis parallel to the X direction to pass. Each of the second mirrors M2 is a concave mirror, and a shape of a reflective surface of the second mirror M2 is set such that the light flux 6*b* is condensed in the through hole 7*a* of the stray light suppressing member 70.

As described above, the base of the stray light suppressing member 70 is formed with the recessed portion recessed in the quadrangular pyramid shape in the X direction, and a length of the through hole 7*a* formed in the base in the X direction is smaller as the through hole 7*a* is closer to the light splitting mirror M1. A size or shape of a first opening on an incident side may vary depending on which light flux 6*b* among the plurality of light fluxes 6*b* passes through the through hole 7*a*. Since the light flux 6*b* is condensed while traveling in the X direction, for example, a diameter of the first opening may be made smaller as the through hole is closer to the light splitting mirror M1. On the other hand, it is desirable that a second opening on an exit side of each through hole 7*a* have the same shape.

In at least some of the plurality of through holes 7*a*, a portion having an inner diameter smaller than that of the first opening is disposed between the first opening and the second opening. That is, inner wall surfaces of at least some of the plurality of through holes 7*a* include inclined wall surfaces inclined with respect to the optical axis (X axis) of the light flux 6*b*. The inclined wall surface does not interfere with the light flux 6*b* of observation light condensed in the through hole, and stray light SL incident on the first opening from a direction different from the optical axis (X axis) of the light flux 6*b* of the observation light is reflected at least a plurality of times and attenuated until reaching the second opening.

It is desirable to provide the inclined wall surface such that the portion having an inner diameter smaller than that of the first opening is disposed between the first opening and the second opening for all of the plurality of through holes 7*a*, but in some cases, the inclined wall surface may be provided only in some of the through holes. For example, in the example of FIG. 12, the inclined wall surface is provided in the through hole disposed at a position close to the light splitting mirror M1, and the inclined wall surface is not provided in the through hole disposed at a position far from the light splitting mirror M1, and only a wall surface parallel to the optical axis of the light flux 6*b* forms the through hole. This is because the through hole disposed at a position far from the light splitting mirror M1 has a large length in the X direction, so that the stray light can be reflected on the inner wall surface a sufficient number of times to be attenuated before reaching the second opening from the first opening without the inclined inner wall surface. On the other hand, the through hole disposed at a position close to the light splitting mirror M1 has a small length in the X direction, and thus, the inner wall surface is inclined, so that the stray light is reflected on the inner wall surface a sufficient number of times to be attenuated before reaching the second opening from the first opening.

In FIG. 12, for convenience of illustration, there are only two types of lengths of the through holes in the X direction, but actually, a large number of through holes are formed in the Z direction and the Y direction, and the lengths of the through holes in the X direction are more than two types. In this case, for example, the inclined wall surface may be provided only in the through hole whose length in the X direction is equal to or smaller than a predetermined length. Alternatively, an inclination angle and a position of the inclined wall surface may be set according to the length of each through hole in the X direction, and in any through hole, the incident stray light SL may be reflected by the inner wall surface a sufficient number of times and attenuated until reaching the second opening. It is a matter of course that the inner wall surfaces of all the through holes are formed so as not to interfere with the light flux 6*b* of the observation light condensed in the through hole.

According to the present embodiment, it is possible to provide an optical member for a spectroscopic device, which allows a light flux traveling on a predetermined optical path to pass, can suppress so-called stray light deviating from the predetermined optical path from passing, and has a simple structure. Further, according to the present embodiment, it is possible to provide a compact spectroscopic device that includes a plane division optical system, suppresses noise caused by stray light, and has high spectral accuracy.

Third Embodiment

Figure 13:
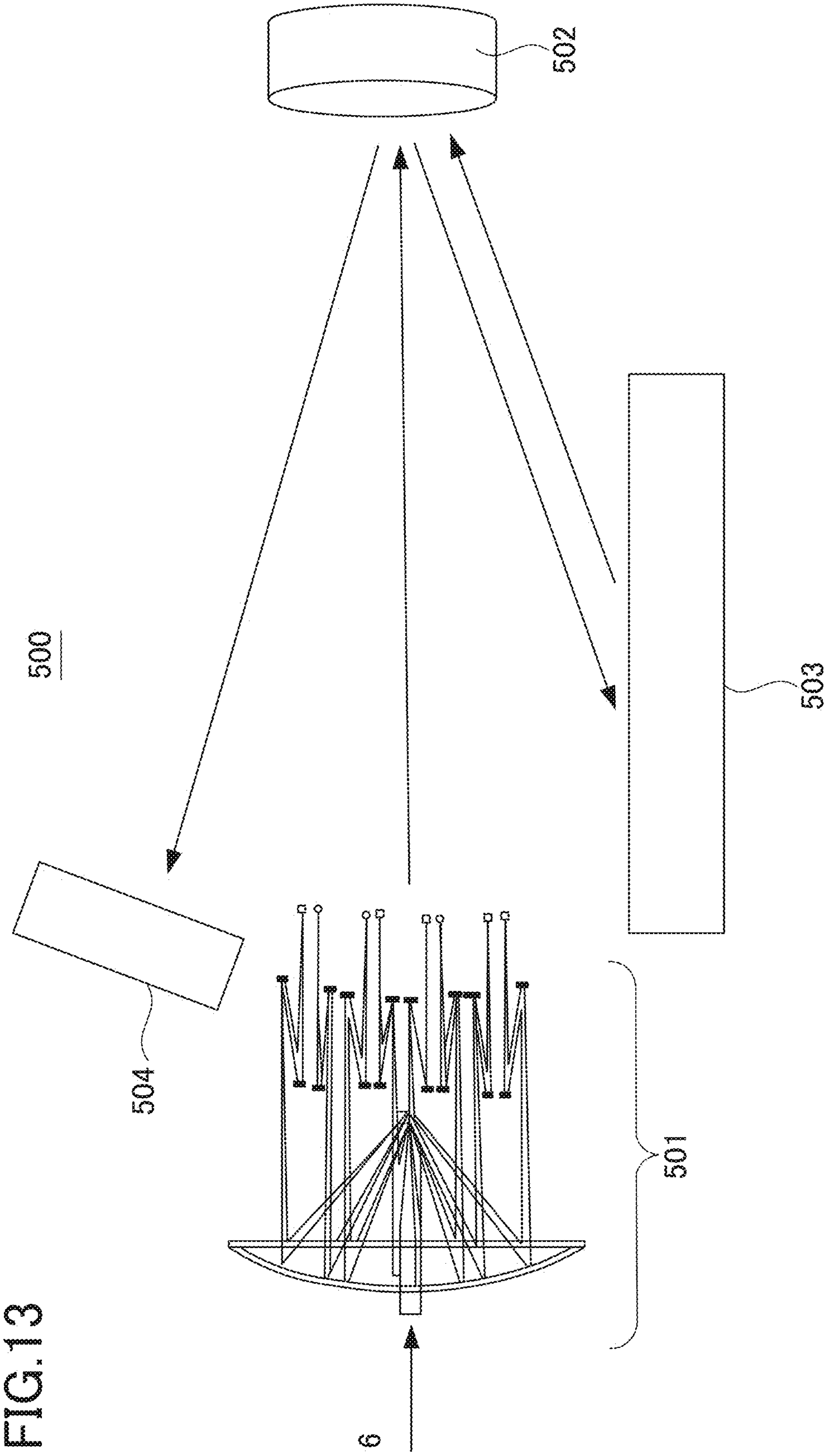
FIG. 13 is a schematic diagram of a plane spectroscopic device according to a third embodiment.

FIG. 13 illustrates a schematic diagram of a plane spectroscopic device 500 according to a third embodiment. The plane spectroscopic device 500 causes observation light desired to be subjected to plane spectral division to be incident on a spectroscopic optical system 501 of the above-described embodiment (for example, FIG. 1), rearranges the observation light by plane division, and then performs the plane spectral division via an imaging mirror 502, a spectroscopic element 503, and a detection unit 504 (light receiving sensor). The light to be spectrally dispersed is, for example, infrared light.

In the plane spectroscopic device 500, reflection is performed from the spectroscopic optical system 501 to the spectroscopic element 503 such as a diffraction grating by using the imaging mirror 502 which is an off-axis parabolic mirror. A light flux spectrally dispersed by the spectroscopic element 503 and spread on a plane is incident on the imaging mirror 502, which is a parabolic mirror, again by diffraction, and forms an image on the detection unit 504 including a two-dimensional detector. As a result, it is possible to obtain a spectral analysis result of an image plane. In the first embodiment, a reflective diffraction grating is used as a third mirror M3 of the spectroscopic optical system 501, but in the present embodiment, a total reflection mirror may be used as the third mirror M3.

In order to obtain an original image for each wavelength, it is possible to obtain an original-image-shaped spectral image by rearranging an image of a desired wavelength on the two-dimensional detector according to a division rule.

Modified Embodiment

Note that the present disclosure is not limited to the embodiments described above. For example, all or some of the different embodiments described above may be combined and implemented.

The disposition of the stray light suppressing member is not limited to the examples of FIGS. 1 and 12, and the stray light suppressing member can be disposed at an arbitrary position in a spectroscopic device including a plane division optical system. For example, in FIG. 1, the stray light suppressing member may be disposed between the fourth mirror M4 and the third mirror M3 or may be disposed between the third mirror M3 and the light receiving sensor 5. That is, the stray light suppressing member can be disposed on the optical path along which the light flux of the observation light is incident on any one of the second mirror M2, the fourth mirror M4, and the third mirror M3. The stray light suppressing member is desirably disposed at a position where the light flux of the observation light is condensed in the optical system. However, the stray light suppressing member may be disposed at a position where the light flux of the observation light remains collimated and is not condensed.

For example, holes may be formed from both sides of one base material so as to communicate with each other in order to form the through hole 7*a* in the form illustrated in FIGS. 9A to 9D, but similarly to the example of FIG. 9E, a plurality of members provided with tapered through holes (inclined wall surfaces) may be stacked to form the through hole 7*a*. In the example of FIG. 9E, the two members are stacked such that the inclined surfaces of the through holes are arranged with the same orientation, but in a case where the two members are stacked opposite to each other such that orientations of the inclined surfaces of the through holes are opposite to each other, the forms illustrated in FIGS. 9A to 9D can be manufactured.

In the first embodiment, an incidence optical path and a reflection optical path are provided coaxially (on one axis), but the embodiment is not limited thereto. For example, as described in WO 2020/203976 A, the stray light suppressing member can be disposed on the optical path even in a so-called off-axis optical system in which an incident optical axis is inclined at an appropriate angle with respect to a mirror axis.

According to the present disclosure, it is possible to provide an optical member for a spectroscopic device, which allows a light flux traveling on a predetermined optical path to pass, can suppress so-called stray light deviating from the predetermined optical path from passing, and has a simple structure. In addition, according to the present disclosure, it is possible to provide a spectroscopic device that includes a plane division optical system, suppresses noise caused by stray light, and has high spectral accuracy.

OTHER EMBODIMENTS

While the present disclosure has been described with reference to embodiments, it is to be understood that the present disclosure is not limited to the disclosed embodiments, but is defined by the scope of the following claims.

Furthermore, the contents of disclosure in the present specification include not only contents described in the present specification but also all of the items which are understandable from the present specification and the drawings accompanying the present specification. Moreover, the contents of disclosure in the present specification include a complementary set of concepts described in the present specification. Thus, if, in the present specification, there is a description indicating that, for example, "A is B", even when a description indicating that "A is not B" is omitted, the present specification can be said to disclose a description indicating that "A is not B". This is because, in a case where there is a description indicating that "A is B", taking into consideration a case where "A is not B" is a premise.

This application claims the benefit of Japanese Patent Application No. 2024-090047, filed Jun. 3, 2024, which is hereby incorporated by reference herein in its entirety.

What is claimed is:

1. An optical member comprising:

a through hole penetrating from a first opening to a second opening, wherein a light flux of observation light incident through the first opening can exit through the second opening, the through hole includes an inclined wall surface inclined with respect to an optical axis of the light flux such that a portion having an inner diameter smaller than an inner diameter of the first opening is disposed between the first opening and the second opening, the light flux of the observation light incident through the first opening is condensable in the through hole, and the inclined wall surface is configured to reflect stray light incident on the first opening from a direction different from the optical axis of the light flux of the observation light toward the second opening at least once.

2. The optical member according to claim 1, wherein the inclined wall surface is configured not to interfere with the light flux of the observation light and configured to reflect the stray light a plurality of times until the stray light reaches the second opening.

3. The optical member according to claim 1, wherein the through hole includes a portion having an inner diameter smaller than both the inner diameter of the first opening and an inner diameter of the second opening and disposed between the first opening and the second opening.

4. The optical member according to claim 1, wherein the inclined wall surface is formed such that an incident angle of the stray light to the inclined wall surface changes when the stray light is reflected a plurality of times by the inclined wall surface.

5. The optical member according to claim 1, wherein $H>d1$ and $H>d3$ are satisfied in which H represents a length of the through hole from the first opening to the second opening, d1 represents an opening diameter of the first opening, and d3 represents an opening diameter of the second opening.

6. The optical member according to claim 1, wherein $\gamma \geq \beta$ is satisfied in which $\gamma$ represents an angle formed by the inclined wall surface and the optical axis of the light flux of the observation light, and $\beta$ represents a condensing angle at which the light flux of the observation light incident on the through hole is condensed.

7. The optical member according to claim 1, wherein $\gamma < 90° - \alpha$ is satisfied in which $\gamma$ represents an angle formed by the inclined wall surface and the optical axis of the light flux of the observation light, and a represents an angle formed by the stray light incident on the first opening and the optical axis of the light flux of the observation light.

8. The optical member according to claim 1, wherein a cross-sectional shape of the through hole is similar between the first opening and the second opening in a cross section of the optical member taken in a direction orthogonal to the optical axis of the light flux.

9. The optical member according to claim 1, wherein a shape of the first opening when viewed from an optical axis direction of the light flux is any one of a circular shape, an elliptical shape, a rectangular shape, a rectangular shape with rounded corners, a rhombus shape, a trapezoidal shape, and a triangular shape.

10. The optical member according to claim 1, wherein in a cross section of the optical member taken along a plane passing through the optical axis of the light flux, the through hole includes an inner wall surface parallel to the optical axis of the light flux between the inclined wall surface and the first opening and/or the through hole includes an inner wall surface parallel to the optical axis of the light flux between the inclined wall surface and the second opening.

11. The optical member according to claim 1, wherein a portion having a smallest inner diameter in the through hole is disposed at a center between the first opening and the second opening in a direction of the optical axis of the light flux, and/or the light flux is condensed at the portion having the smallest inner diameter in the through hole.

12. The optical member according to claim 1, wherein a portion having a smallest inner diameter in the through hole is disposed at a position shifted from a center between the first opening and the second opening in a direction of the optical axis of the light flux,
and/or
the light flux is condensed at a position shifted from the portion having the smallest inner diameter in the through hole.

13. The optical member according to claim 1, wherein a plurality of members including a part of the through hole are stacked in a direction of the optical axis of the light flux.

14. The optical member according to claim 1, wherein an inner wall surface of the through hole has been subjected to a blackening treatment.

15. The optical member according to claim 1, further comprising a second through hole penetrating from a third opening to a fourth opening, wherein
a light flux of observation light incident through the third opening can exit through the fourth opening,
the second through hole includes a second inclined wall surface inclined with respect to the optical axis of the light flux such that a portion having an inner diameter smaller than an inner diameter of the third opening is disposed between the third opening and the fourth opening,
the light flux of the observation light incident through the third opening is condensable in the second through hole, and
the second inclined wall surface is configured to reflect stray light incident on the third opening from a direction different from the optical axis of the light flux of the observation light toward the fourth opening at least once.

16. An optical system comprising:
the optical member according to claim 1;
a first mirror configured to split the observation light into a plurality of light fluxes and reflect the light fluxes in different directions;
a second mirror disposed on an optical path of each light flux of the plurality of light fluxes reflected by the first mirror;
a third mirror disposed on an optical path of each light flux of the plurality of light fluxes reflected by the second mirror; and
a fourth mirror disposed on an optical path of each light flux of the plurality of light fluxes reflected by the third mirror,
wherein the through hole is disposed on the optical path of any light flux of the plurality of light fluxes incident on the third mirror or the fourth mirror.

17. The optical system according to claim 16, wherein the mirror includes a reflective diffraction grating.

18. A spectroscopic device comprising:
the optical system according to claim 16; and
a light receiving sensor configured to receive the plurality of light fluxes reflected by the mirror.

19. An optical system comprising:
a mirror disposed on an optical path of each light flux of a plurality of light fluxes; and
the optical member according to claim 1,
wherein the through hole is disposed on the optical path of any light flux of the plurality of light fluxes.

20. A spectroscopic device comprising:
the optical system according to claim 18;
an imaging mirror configured to form an image of the plurality of light fluxes reflected by the mirror;
a spectroscopic element; and
a light receiving sensor.

* * * * *